April 22, 1924.

E. E. FOSTER

AIR PUMP

Filed May 11, 1923

1,491,388

INVENTOR
Edwin E. Foster
BY Adam E. Fisher
ATTORNEY

Patented Apr. 22, 1924.

1,491,388

UNITED STATES PATENT OFFICE.

EDWIN E. FOSTER, OF AUSTIN, TEXAS.

AIR PUMP.

Application filed May 11, 1923. Serial No. 638,203.

*To all whom it may concern:*

Be it known that I, EDWIN E. FOSTER, a citizen of the United States, residing in the city of Austin, county of Travis, and State of Texas, have invented new and useful Improvements in Air Pumps, of which the following is a specification, reference being had to the accompanying drawings.

This invention relates to air-pumps, and particularly to such as are used in the inflation of pneumatic tires and tubes for vehicle wheels, and the chief object is to provide a convenient, portable and efficient air-pump of the cylinder and piston type, operable by hand, wherein cylinders and piston heads are so associated and arranged as to practically afford a pump having triple-cylinder capacity in a size no larger than a one-cylinder pump. Other objects and advantages will appear in the course of this specification.

Figures 1, 2:
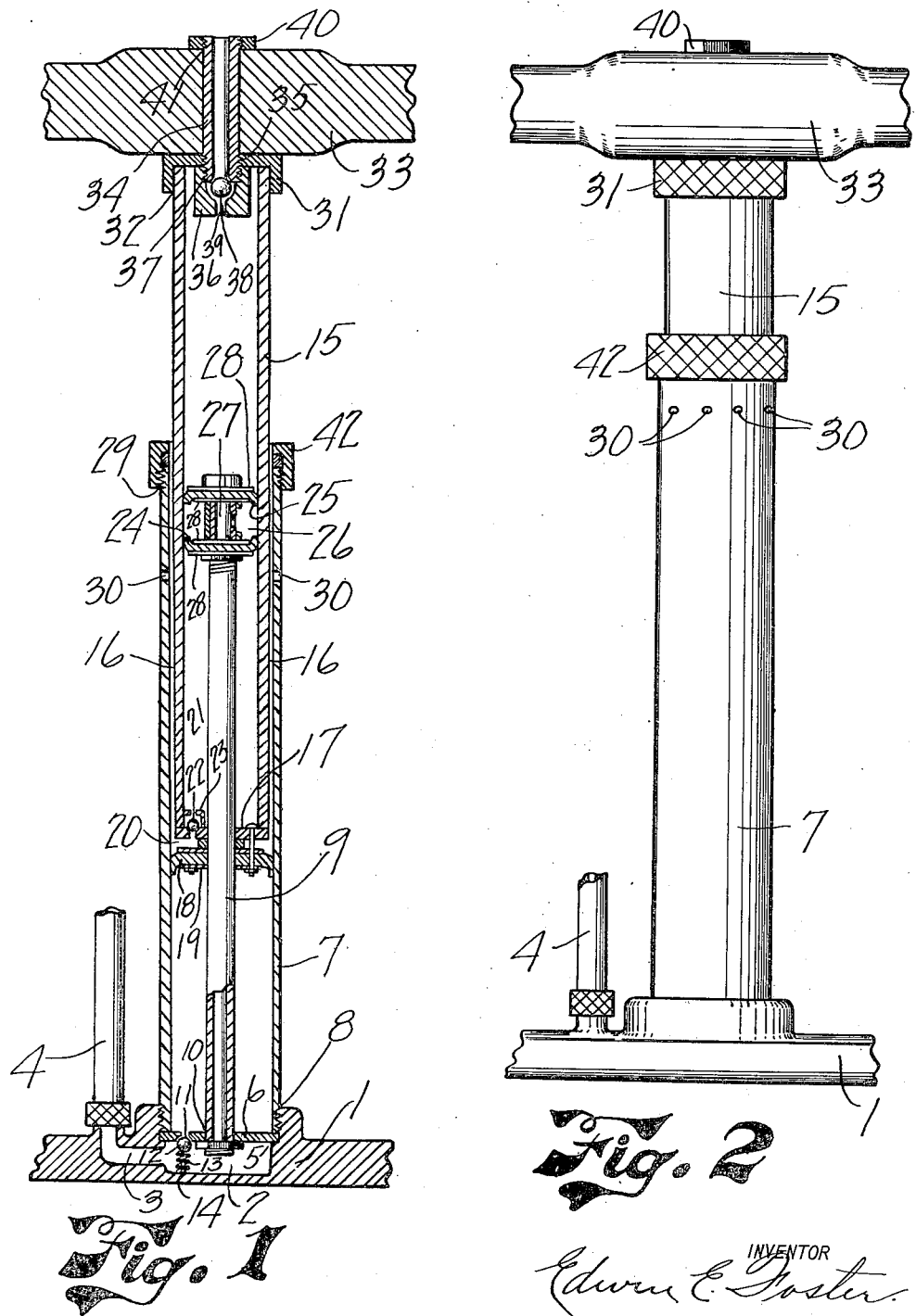
Figure 1 is a longitudinal section through the pump.
Figure 2 is an elevation of the pump.

The invention consists of a suitable base or foot-piece 1, formed with an air recess 2 communicating through a duct 3 with the air delivery pipe 4. The foot-piece 1 is formed with an annular shoulder 5 upon which is seated a base washer 6. Into the foot-piece 1 are detachably mounted a relatively large stationary air-cylinder 7 having a threaded connection 8 with the foot-piece, and a small central air-tube 9 having a threaded connection 10 through the base washer 6. The tube 9 is thus given direct communication with pipe 4. Through the washer 6 is formed an air port 11, at the under side of which is seated a ball-valve 12 held to its seat by a coil spring 13 seated over a pin 14. Within the cylinder 7 is slidingly mounted a reciprocating air-cylinder 15, its outer diameter being slightly less than the inner diameter of the cylinder 7, so as to leave a small intervening air space 16 between the two cylinders. An annular piston head 17 is mounted at the lower end of the inner reciprocating cylinder 15, the same encircling the air tube 9 and having a downwardly cupped flexible ring 18 supported at its under side by a metal washer 19. A lateral air duct 20 connects the air space 16 with the interior 21 of the cylinder 15 above the piston 17 and the upper mouth of this duct is covered by a ball valve 22 in a cage 23 for admitting air into the reciprocating cylinder on its downward stroke. At the upper end of the air tube 9 are mounted two flexible rings 24 and 25, they being spaced apart and cupped toward each other as shown, to form an intervening two-way air trap 26, designed to collect the compressed air from above it or below it, from either end of the cylinder 15, as that cylinder is moved up and down in the outer cylinder 7, and direct the said compressed air through a port 27 in the end of the tube 15, down through the said tube and out through the delivery pipe 4. The leather rings 24 and 25 are properly supported at each side by metal washers 28. An annular cap 42 encircles the top of the outer cylinder 7 and the body of the reciprocating cylinder and is detachably joined to the outer cylinder by a threaded connection 29. Below the cap 28 a number of air ports 30 are pierced through the outer cylinder 7 and lead air into the space 16, whence on the downward stroke of the inner cylinder 15 the air flows through the duct 20 up into space 21 of the cylinder 15. At the top of the reciprocating cylinder 15 is detachably mounted an annular cap 31 having a threaded connection 32 with the cylinder, and the handle 33 is secured to this top cap by means of a tubular bolt 34 extended through the handle and having a threaded connection at 35 through the said cap 31. A valve cap 36 is detachably mounted at the lower end of the tubular bolt 34 by a threaded connection 37 and a ball valve 38 is placed within this cap and seats against the lower end of the tubular bolt 34. An air duct 39 leads down through the valve cap 36, thus admitting air through the tubular bolt 34 into the upper end of the cylinder 15 on the upward stroke of the said cylinder and closing upwardly against its seat on the downward stroke. A nut 40 has threaded connection at 41 with the upper end of the tubular bolt 34 and affords means for locking the handle in place. On the downward stroke of the cylinder 15 air is forced into the pipe 4 both by the piston 17 carrying the downwardly cupped leather ring 18 and by the lower and upwardly cupped lower leather ring 24 at the top of the tube 9, this latter stream of air being directed through the port 27 and down through the tube 9. At the same time air feeds through the ports 30, air space 16 and duct 20 up into the space 21 of the cylinder 15. Then on the upward stroke of the cylinder 15 this air is trapped by the downwardly cupped upper leather ring 25 and directed through the port 27 into the tube 9. Thus the pump forces two separate streams of air into the pipe 4 on the downward stroke, and one stream of air into the pipe 4 on the upward stroke.

While I have herein described a certain specific manner and method of constructing and assembling the elements of my invention, it is understood that I may vary from the same in minor details, not departing from the spirit of the invention, so as to best construct a practical device for the purpose intended, as defined in the appended claims.

I claim:

1. An air pump of the kind described, comprising a foot-piece having an air recess and duct adapted for the connection of a delivery pipe, the recess having an annular shoulder around its mouth; a base washer seated on the shoulder; a downwardly opening valve leading through said base washer; a relatively large stationary air cylinder mounted on the base washer over the air recess of the foot-piece and having air ports near its upper end; a relatively small air tube mounted through the base washer, said tube having an air port in its upper end; a reciprocating air cylinder mounted within the stationary air cylinder with an air space between the two; an annular piston head at the lower end of the reciprocating cylinder and encircling the central air tube, the piston having a downwardly cupped flexible ring and an air duct connecting the interior of the reciprocating cylinder above its piston with the air space between the two cylinders; a valve at the upper mouth of the duct for admitting air into the reciprocating cylinder on its downward stroke; an air-trap at the upper end of the central air tube; consisting of two flexible rings spaced apart and cupped toward each other to direct air down through the said port in the end of the tube; an annular cap at the top of the stationary cylinder and encircling the body of the reciprocating cylinder; a handle at the top of the reciprocating cylinder having an air duct leading therethrough into the said cylinder; and a valve set in said duct so as to admit air into the cylinder on its upward stroke.

2. An air pump of the kind described, comprising a foot-piece having an enclosed air recess and duct for connecting a delivery pipe; a relatively large stationary air cylinder on the foot-piece over the air recess; a downwardly opening valve leading from the lower end of the said cylinder into the air recess of the foot-piece; a relatively small air tube having a port at its upper end and being centrally mounted within the stationary cylinder on the foot-piece, and communicating directly with the air recess therein; a reciprocating air cylinder within the stationary cylinder with an air space between; an annular piston head at the lower end of the reciprocating cylinder and encircling the central air tube, the piston having a downwardly cupped flexible ring adapted to force air downwardly in the stationary cylinder and having also a lateral air duct connecting through an upwardly opening valve, the interior of the reciprocating cylinder with the air space between the cylinders; an air trap at the upper end of the central air tube, including two spaced flexible rings covering the upper port of the central air tube and being cupped toward each other; and a handle at the top of the reciprocating cylinder having a valve controlled air duct therethrough into the said cylinder, the valve being set to admit air on the upward stroke.

3. An air pump of the kind described, comprising a foot-piece with an enclosed air recess and an outwardly opening duct; a stationary air cylinder on the foot-piece; a downwardly opening valve leading from the cylinder into the air recess of the foot-piece; an air tube within the cylinder, on the foot-piece, and communicating directly with the recess, the tube having an air port at its upper end; a reciprocating air cylinder within the stationary cylinder, there being an air space between the two; a piston head on the lower end of the reciprocating cylinder adapted to force air downwardly through the stationary cylinder and having a lateral valve-controlled duct into the space between the cylinders; an air-trap at the upper end of the air tube adapted to direct air into the tube through its port on both the downward and upward movement of the reciprocating cylinder; and a handle at the upper end of the reciprocating cylinder having a valve-controlled air inlet into the said cylinder; all of said valves being set to force air through the said outwardly opening duct of the foot-piece on both the downward and upward stroke of the reciprocating cylinder.

4. An air pump as described, comprising a recessed foot-piece having an outwardly directed air duct; a stationary air cylinder on the foot-piece; an air escape valve connecting the lower end of the air cylinder with the recess in the foot-piece; an air tube with a port at its upper end, centrally mounted on the foot-piece and within the stationary cylinder, and opening directly into the recess of the foot-piece; a reciprocating air cylinder within the stationary cylinder, there being an intervening air space; a piston head on the lower end of the reciprocating cylinder adapted to force air downwardly and having a valve controlled duct into the space between the cylinders; an air-trap at the upper end of the air tube adapted to direct air into the tube through its said port, on both movements on the reciprocating cylinder; and a handle at the upper end of the reciprocating cylinder having a valve-controlled inlet to the cylinder, all of the said valves being set to make the pump operative on both movements of the reciprocating cylinder.

5. An air pump as described, comprising a recessed foot-piece having an outlet from the recess; a stationary air cylinder on the foot-piece; a valve leading from the lower end of the air cylinder into the recessed foot-piece; an air tube centrally fixed on the foot-piece, within the stationary cylinder and opening into the recess of the foot-piece, the said tube having an air port at its upper end and an air trap adapted to entrap air into the tube from above or below; a reciprocating air cylinder within the stationary cylinder with the air space between the cylinders, the reciprocating cylinder fitting over the air trap of the central tube and having an annular piston, operative downwardly, fitting the stationary cylinder and encircling the central air tube, the piston having an air duct into the space between the cylinders; a handle at the upper end of the reciprocating cylinder, the handle having an air duct into the cylinder; and valves seated in all the said ducts to make the pump operative on both movements of the reciprocating cylinder.

6. In an air pump of the kind described and including a foot-piece having a recess and an outlet therefrom; a stationary air cylinder and an air tube centrally placed therein, both being mounted on the foot-piece and communicating through air ducts with the recess thereof, and the air tube having an air port thereinto at its upper end and a two-way air trap; an outwardly directed valve mounted in the duct connecting the stationary air cylinder with the recess of the foot-piece; and a reciprocating cylinder within the stationary cylinder with space between the two, the reciprocating cylinder having an annular piston encircling the air tube, fitting the stationary tube and operative downwardly only therein, the said piston having an air duct into the space between the cylinders and having an air duct at its upper end communicating with the outer air; and valves controlling all of the said communicating air ducts to make the pump operative on both reciprocal movements of the reciprocating cylinder.

EDWIN E. FOSTER.

Witnesses:
S. P. FLOORE,
F. R. ROSTON.